Patented Sept. 17, 1935

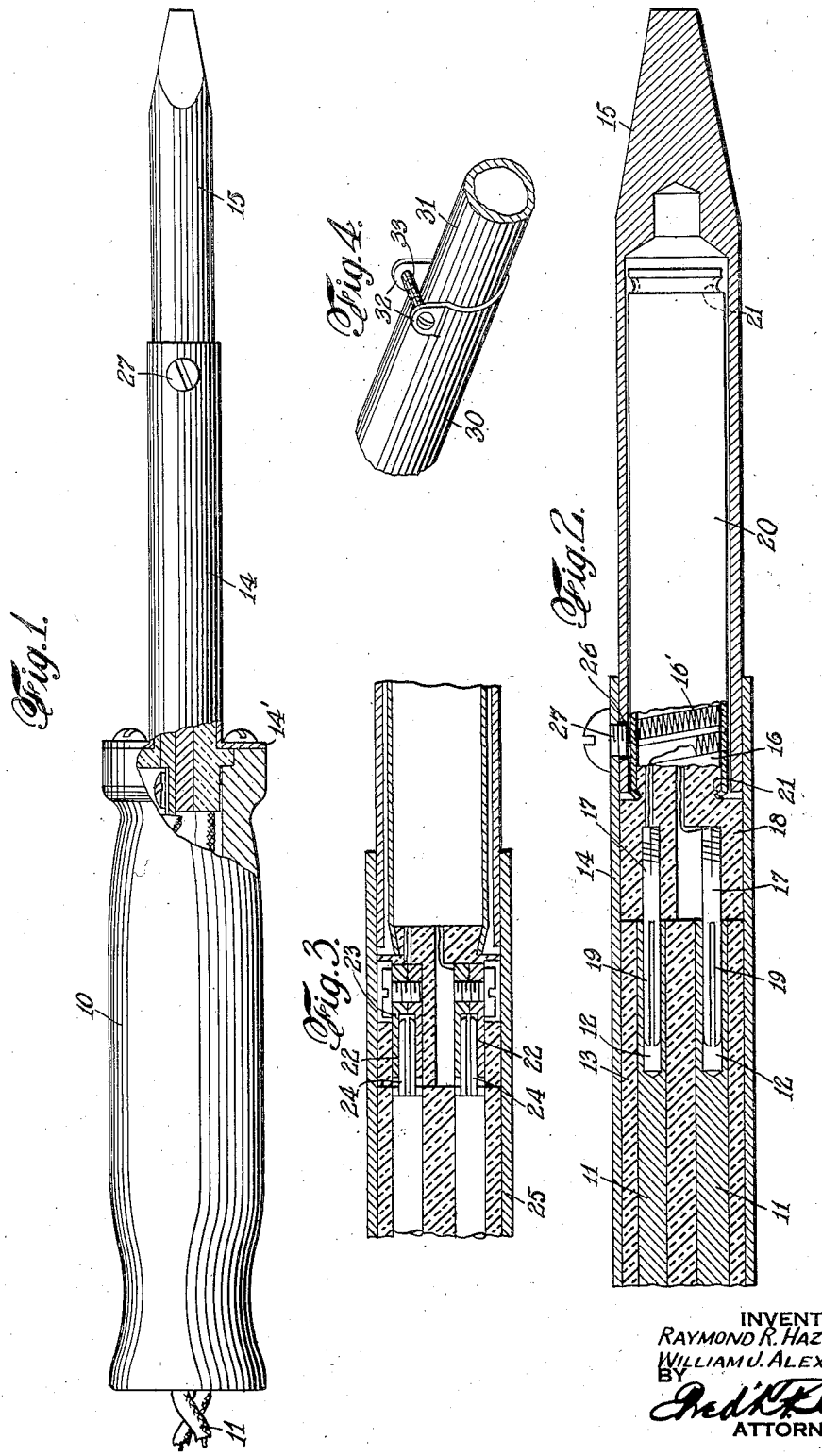

2,014,567

UNITED STATES PATENT OFFICE 2,014,567

REMOVABLE CARTRIDGE FOR ELECTRIC SOLDERING IRONS

Raymond R. Hazlett, Linden, and William J. Alexander, Nutley, N. J.

Application October 31, 1931, Serial No. 572,240

1 Claim. (Cl. 219—26)

The invention relates to the construction of electrically heated implements, more especially soldering irons.

It has for an object to so associate the heating element with the active portion of the device, for example the heating point or tip of a soldering iron, that not only will this point be heated very quickly but the said heating element is readily renewable should the same for any reason burn out or become defective.

Another object of the invention contemplates the attachment of the tip to the shank of the tool in such a manner as to avoid the usual screw fit.

A further object of the invention resides in the provision of a mounting for the cartridge whereby it will accommodate itself within the tip against stresses developing as a result of the relatively high temperatures prevailing when the iron is in use.

It has been proposed heretofore to provide a screw-threaded connection between the heating element and the soldering point of an iron, and to carry the conductors from the heating unit through the shank of the tool. In practice it has been found that a screw fit between the two members will freeze and render the separation of a heating element from its tip impracticable in that the latter will, in the attempted separation, be squeezed in by holding pliers or the like and whereby also the heating element may become damaged. Furthermore, the manner of connecting in the conductors for the heating coil does not admit of ready and convenient replacement of such coil.

In carrying out the present invention, the heating coil is constructed as an individual unit, in the form of a cartridge, which may be readily inserted in position within a hollow heating point or the like wherein it more or less floats, and the leads from the coil are connected to separable electrical connecting means, for example, in the nature of prongs protruding from an insulation head of the heating element and adapted to fit within suitable sockets mounted in the shank of the tool. Or, the sockets may be provided in the head, and the prongs caused to extend from the shank of the iron.

Furthermore, this insulation head is adapted to hang from such connection to float the cartridge as a hole within the tip, and a sleeve is provided to fit over both the said head and inner end of the tip, having a sliding fit with the latter. Said sleeve is to be secured to the tip in any suitable manner as through one or more screws or the like threaded through the sleeve and designed to fit within a positioning opening provided in the inner end of the said tip.

The cartridge itself comprises an axially bored insulation rod upon which is wound a heating coil and over which is provided a sheath or metal bushing spun at its ends into circumferential grooves of the rod, with suitable connection means associated with the terminals of the heating coil.

The nature of the invention, however, will best be understood when described in connection with the accompanying drawing, in which:

Fig. 1 is a view in elevation of the invention as embodied in an electric soldering iron, with portion shown in longitudinal section.

Fig. 2 is a fragmentary longitudinal section of the active end thereof and on an enlarged scale.

Fig. 3 is a fragmentary longitudinal section illustrating a modification in separable electrical connection means of the heating cartridge.

Fig. 4 is a fragmentary perspective view of a modified means for securing the tip and sleeve of the iron together.

Referring to the drawing, 10 designates the handle portion of an electric soldering iron as one embodiment of our invention, heating current being supplied thereto from a suitable source, as by means of the conductors 11 passing through the handle 10 and connected to sockets or the like 12. These socket members are secured in an insulation cylinder 13 which is suitably retained within the handle portion and a shank or sleeve 14 thereof, as by means of a flange 14' at the inner end of said sleeve and screwed to the juxtaposed handle end.

Provision is made, in accordance with the invention, to removably secure not only the heating tip 15 of the tool to said sleeve but also to removably mount a heating coil unit within the said tip such that said unit may readily and conveniently be removed therefrom in case it should burn out or otherwise become defective.

To this end, the heating coil is provided in the nature of a suitable cartridge member comprising an axially bored insulation rod or the like 16 upon which is to be wound in the usual manner the heating coil or resistor 16' having the pair of terminals 17 thereof mounted on an enlarged head 18 of the said rod. The terminals 17, moreover, are arranged to protrude beyond the head 18 to afford the pair of split prongs 19 for resilient engagement in the sockets 12, thereby serving to connect in the heating unit with the source of supply of electricity for operating the iron.

It will be appreciated that the cartridge as a whole may thus readily be disconnected from the sockets 12 in replacing said cartridge, and a protective encasing shell or sheath 20, preferably of metal, is provided about the heating coil portion of the cartridge immediately below its insulating head 18 and extending substantially to its opposite end. This casing is so applied as to be substantially irremovable in that at its opposite ends it is spun into circumferential grooves 21 of the rod 16.

In the embodiment shown in Fig. 3, the connecting means are arranged in the reverse manner, that is to say, the sockets 22 are provided in the head 23 to receive the prongs 24 retained within the sleeve 25.

To assemble the said cartridge for use in the soldering iron set forth, the same is designed to be held through its prongs 19 in the sockets 12 into which the prongs have been inserted, and the hollow tip member 15 is then slipped over the outer end of the cartridge. The said tip near its inner end is also provided with one or more perforations 26, the same being adapted to register with and receive a screw 27 threaded through the outer edge of the sleeve 14. This sleeve has a relatively loose fit thereover and is slidable thereon; and, by registering the screw in a perforation 26, the tip with contained heating cartridge may thus be retained to the handle portion 10.

Or, and as indicated in Fig. 4 of the drawing, the outer end of the sleeve 30 may be clamped over the inner end of the tip 31, as in providing the upstanding ears 32 from said sleeve and threading a screw 33 into the far one after passing it through the near ear and taking up thereon sufficiently to secure the desired hold. This form is especially suitable for the larger sizes of soldering irons.

To replace the cartridge, it is necessary merely to withdraw screw 27 from the perforation 26, Figs. 1 and 2, or to loosen the screw 33, Fig. 4, and slide the tip out of the sleeve to expose the cartridge which may then be withdrawn by pulling out the prongs from their sockets. A new cartridge may then be substituted by inserting its prongs into the sockets aforesaid and the tip replaced and secured as hereinbefore described.

By this expedient, no binding or freezing of the parts can occur, and the cartridge constituting the heating unit also floats freely within the tip, while replacement, if required, of the cartridge is expedited in view of its ready removability and positioning. A very simple, compact and effective heating element is thus afforded for the use set forth.

We claim:

In an electric soldering iron including a handle portion with sleeve and a hollow metal tip removably attached to the sleeve: a removable heating element to fit within the tip and comprising a rod of insulating material with a head at its inner end, said rod being adapted to support a resistor, terminal prongs mounted within the head and connected to the resistor for affording separable electrical connection thereof to the handle portion, and a metal sheath between the outer end of the rod and the head for encasing the resistor and having its ends spun into circumferential grooves at the end portions of the rod.

RAYMOND R. HAZLETT.
WILLIAM J. ALEXANDER.